United States Patent
Lakhani et al.

(10) Patent No.: US 12,548,039 B2
(45) Date of Patent: Feb. 10, 2026

(54) SYSTEM AND METHOD FOR ESTIMATING IN-STORE DEMAND BASED ON ONLINE DEMAND

(71) Applicant: Walmart Apollo, LLC, Bentonville, AR (US)

(72) Inventors: Anshul Lakhani, Sunnyvale, CA (US); Taizhou Li, San Jose, CA (US); Santhosh Kumar Shanmugam, San Jose, CA (US); John Penfield Bowman, El Cerrito, CA (US)

(73) Assignee: Walmart Apollo, LLC, Bentonville, AR (US)

(*) Notice: Subject to any disclaimer, the term of this patent is extended or adjusted under 35 U.S.C. 154(b) by 329 days.

(21) Appl. No.: 18/103,896

(22) Filed: Jan. 31, 2023

(65) Prior Publication Data
US 2024/0257165 A1    Aug. 1, 2024

(51) Int. Cl.
*G06Q 30/0202* (2023.01)
*G06N 20/00* (2019.01)
*G06Q 10/087* (2023.01)

(52) U.S. Cl.
CPC ......... *G06Q 30/0202* (2013.01); *G06N 20/00* (2019.01); *G06Q 10/087* (2013.01)

(58) Field of Classification Search
None
See application file for complete search history.

(56) References Cited

U.S. PATENT DOCUMENTS

| | | | |
|---|---|---|---|
| 8,429,013 B2 | 4/2013 | Symons et al. | |
| 11,120,361 B1* | 9/2021 | Januschowski | G06N 20/00 |
| 11,238,482 B1* | 2/2022 | Gaynor | G06Q 10/0875 |
| 2011/0231224 A1* | 9/2011 | Winters | G06Q 30/06 |
| | | | 705/7.29 |

(Continued)

FOREIGN PATENT DOCUMENTS

| | | |
|---|---|---|
| CN | 113095887 A | 7/2021 |
| CN | 114971748 B | 11/2022 |

OTHER PUBLICATIONS

Bradlow et al. "The Role of Big Data and Predictive Analytics in Retailing. "Journal of Retailing, vol. 93, Issue 1, Mar. 2017, pp. 79-95. (Year: 2017).*

(Continued)

*Primary Examiner* — Susanna M. Diaz
(74) *Attorney, Agent, or Firm* — Jones Day

(57) ABSTRACT

Systems and methods for estimating in-store demand based on online data are disclosed. In some embodiments, a machine learning model is trained based on data of shared items that are being sold both online and in-store by a retailer. For a physical store of the retailer, inference items are determined from items being sold online but not in-store. An estimated demand is computed for each inference item to be offered for sale in the physical store in a future time period, based on the trained machine learning model and online data of the inference item. Based on the estimated demands for the inference items, recommended assortment data is generated for the physical store in the future time period, and is transmitted to a computing device associated with the physical store for assortment refresh.

20 Claims, 10 Drawing Sheets

(56) References Cited

U.S. PATENT DOCUMENTS

| | | | | |
|---|---|---|---|---|
| 2015/0248630 | A1* | 9/2015 | Ramanan | G06Q 30/02 |
| | | | | 705/7.25 |
| 2017/0032290 | A1* | 2/2017 | Ford | G06Q 10/087 |
| 2018/0005171 | A1* | 1/2018 | Harsha | G06Q 30/0201 |
| 2018/0075401 | A1* | 3/2018 | Harsha | G06Q 30/0202 |
| 2019/0147463 | A1* | 5/2019 | Karmakar | G06N 20/00 |
| | | | | 705/7.31 |
| 2020/0005209 | A1* | 1/2020 | Rangarajan | G06Q 10/087 |
| 2020/0134640 | A1* | 4/2020 | Morgan | G06Q 30/0202 |
| 2021/0192435 | A1* | 6/2021 | Fernandes | G06Q 10/087 |
| 2021/0342897 | A1* | 11/2021 | Claramonte | G06Q 30/0281 |
| 2023/0153844 | A1* | 5/2023 | Jari | G06Q 10/06315 |
| | | | | 705/7.31 |
| 2023/0376981 | A1* | 11/2023 | Hall | G06N 5/022 |
| 2023/0394512 | A1* | 12/2023 | Kumar | G06N 3/0442 |

OTHER PUBLICATIONS

Wölbitsch et al. "Beggars Can't Be Choosers: Augmenting Sparse Data for Embedding-Based Product Recommendations in Retail Stores." UMAP'19, Jun. 9-12, 2019, Larnaca, Cyprus, pp. 104-112. (Year: 2019).*

U.S. Appl. No. 63/342,932, filed May 17, 2022. (Year: 2022).*

Kakarla, R., Krishnan, S., Alla, S. (2021). Model Evaluation. In: Applied Data Science Using PySpark. Apress, Berkeley, CA. https://doi.org/10.1007/978-1-4842-6500-0_6. Current chapter first published at https://doi.org/10.1007/978-1-4842-6500-0_6 online: Dec. 18, 2020. (Year: 2020).*

English Translation of KR 2095861 B1. Tak (Inventor). Published Apr. 2, 2020. (Year: 2020).*

IP.com, Correlated online to offline marketting system and method, https://ip.com/IPCOM/000227712, May 13, 2013, 5 pages.

* cited by examiner

|  | Shared items | | | | | Ecom-only items | |
|---|---|---|---|---|---|---|---|
| | | ecom_yearly_sales_US | | | | | |
| catg | count | mean | median | min | max | ecom_only_counts | perct_counts |
| 1 | 158 | 54.474684 | 51.0 | 1 | 105 | 51981 | 96.170284 |
| 2 | 158 | 172.139241 | 174.5 | 106 | 238 | 1225 | 2.266378 |
| 3 | 158 | 323.645570 | 324.5 | 243 | 415 | 410 | 0.758543 |
| 4 | 157 | 552.140127 | 549.0 | 418 | 688 | 225 | 0.416274 |
| 5 | 157 | 856.808917 | 855.0 | 689 | 1029 | 109 | 0.201661 |
| 6 | 158 | 1297.588608 | 1284.5 | 1031 | 1582 | 62 | 0.114706 |
| 7 | 157 | 1927.707006 | 1895.0 | 1589 | 2341 | 16 | 0.029602 |
| 8 | 158 | 2869.208861 | 2869.0 | 2350 | 3444 | 14 | 0.025901 |
| 9 | 157 | 4558.076433 | 4497.0 | 3451 | 5982 | 5 | 0.009251 |
| 10 | 158 | 13617.531646 | 10513.5 | 6081 | 76553 | 4 | 0.007400 |

FIG. 9

SYSTEM AND METHOD FOR ESTIMATING IN-STORE DEMAND BASED ON ONLINE DEMAND

TECHNICAL FIELD

This application relates generally to in-store assortment optimization and, more particularly, to systems and methods for estimating a novel online item's in-store item demand based on the item's online demand and its similarity to items sold in stores.

BACKGROUND

A same retailer may sell products both online and in physical stores. While a physical store may offer for sale only a limited number of items (e.g. ~ 100 items in a category) due to its space constraint, a website hosted by the retailer may offer for sale much more items (e.g. >100,000 items in the category) as the online orders can be fulfilled by a network of supply chain channels, including distribution centers, warehouses, and/or third party sources. That is, ecommerce has a much longer tail of items than in-store retail.

It is crucial for a physical store to keep its assortment on store shelves relevant and being a good representation of customer demand for the items in the assortment, as the shelf space is very valuable for the retailer and lots of labor cost are involved in replenishing the shelf space and managing the supply chain accordingly. Some existing methods to forecast an in-store demand for an item in next year require at least two years of in-store sale history. While a retailer may want to refresh its in-store assortment with evolving ecommerce trends, social trends, selecting which item to bring to store from ecommerce and determining an expected demand for the selected item for each store are challenging, especially when there is zero history of in-store sales for the novel ecommerce items.

SUMMARY

The embodiments described herein are directed to systems and methods for estimating in-store demand based on online demand to refresh and optimize assortment of a retailer store. In some embodiments, demand signals are provided as inputs to optimize the overall in-store assortment of an omni-retailer.

In various embodiments, a system including a non-transitory memory configured to store instructions thereon and at least one processor is disclosed. The at least one processor is operatively coupled to the non-transitory memory and configured to read the instructions to: obtain in-store data of a first set of items being offered for sale in a plurality of physical stores associated with a retailer; obtain online data of a second set of items being offered for sale on a website associated with the retailer; determine an intersection of the first set and the second set; generate a training dataset based on the in-store data and the online data of items in the intersection; train a machine learning model based on the training dataset; determine, for at least one physical store associated with the retailer, a plurality of inference items that are in the second set but not in the first set; for each inference item of the plurality of inference items, compute, based on the trained machine learning model and the online data of the inference item, an estimated demand for the inference item to be offered for sale in the at least one physical store in a future time period (e.g. of 52 weeks); generate, based on the estimated demands for the plurality of inference items, recommended assortment data for the at least one physical store in the future time period; and transmit the recommended assortment data to a computing device associated with the at least one physical store for assortment refresh.

In various embodiments, a computer-implemented method is disclosed. The computer-implemented method includes: obtaining in-store data of a first set of items being offered for sale in a plurality of physical stores associated with a retailer; obtaining online data of a second set of items being offered for sale on a website associated with the retailer; determining an intersection of the first set and the second set; generating a training dataset based on the in-store data and the online data of items in the intersection; training a machine learning model based on the training dataset; determining, for at least one physical store associated with the retailer, a plurality of inference items that are in the second set but not in the first set; for each inference item of the plurality of inference items, computing, based on the trained machine learning model and the online data of the inference item, an estimated demand for the inference item to be offered for sale in the at least one physical store in a future time period; generating, based on the estimated demands for the plurality of inference items, recommended assortment data for the at least one physical store in the future time period; and transmitting the recommended assortment data to a computing device associated with the at least one physical store for assortment refresh.

In various embodiments, a non-transitory computer readable medium having instructions stored thereon is disclosed. The instructions, when executed by at least one processor, cause at least one device to perform operations including: obtaining in-store data of a first set of items being offered for sale in a plurality of physical stores associated with a retailer; obtaining online data of a second set of items being offered for sale on a website associated with the retailer; determining an intersection of the first set and the second set; generating a training dataset based on the in-store data and the online data of items in the intersection; training a machine learning model based on the training dataset; determining, for at least one physical store associated with the retailer, a plurality of inference items that are in the second set but not in the first set; for each inference item of the plurality of inference items, computing, based on the trained machine learning model and the online data of the inference item, an estimated demand for the inference item to be offered for sale in the at least one physical store in a future time period; generating, based on the estimated demands for the plurality of inference items, recommended assortment data for the at least one physical store in the future time period; and transmitting the recommended assortment data to a computing device associated with the at least one physical store for assortment refresh.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein:

FIG. 9 illustrates an exemplary method to determine inference items for estimating in-store demand, in accordance with some embodiments of the present teaching.

DETAILED DESCRIPTION

Figure 1:
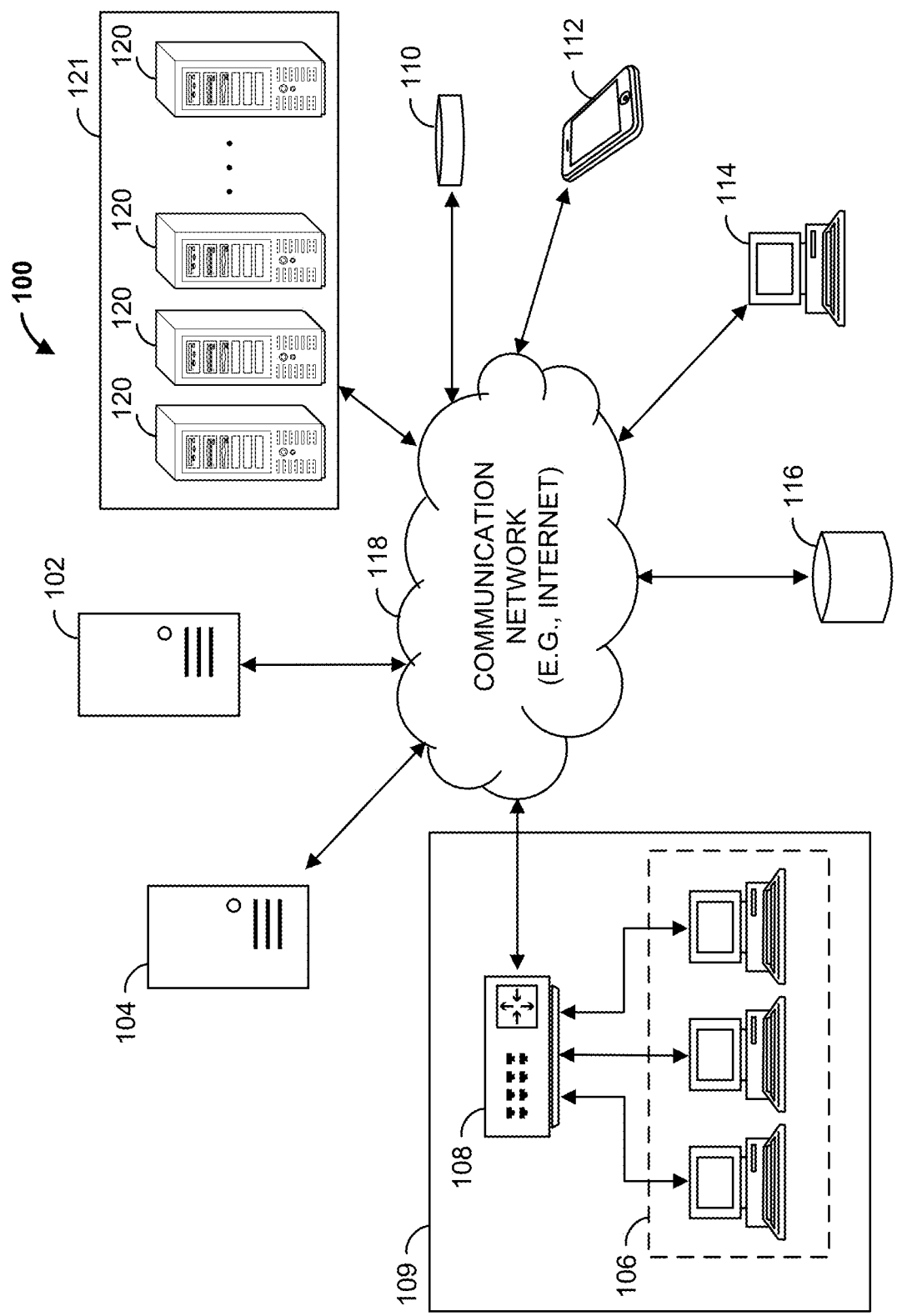
FIG. 1 is a network environment configured for estimating in-store demand based on online demand, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

Retailers want to refresh assortment in stores based on evolving ecommerce trends. The present teaching discloses embodiments to recommend an assortment to a physical store based on estimated demands for online-only items that are sold online but not in-store. In some embodiments, based on a machine learning model, the estimated demand is computed to forecast an in-store demand when the previous online-only item is offered for sale in the physical store during a future time period, e.g. the next year. Assuming a retailer can always provide enough supply given an estimate of demand, the demand number may be equal to the sales number.

In some embodiments, the machine learning model is architected and built to learn from a shared item space between ecommerce and stores. In some embodiments, the machine learning model is trained based on identifying top similar items to a shared item that is sold both online and in-store, e.g. using similar item descriptions learnt using BERT (Bidirectional Encoder Representations from Transformers), a deep learning model in natural language processing tasks. A similarity-based demand score for the shared item can be computed based on a weighted average of in-store demands of the top similar items weighted based on their respective similarity scores to the shared item. During an inference stage, an estimated in-store demand for a previous online-only item can be determined based on a similarity-based demand score computed for the online-only item.

In some embodiments, the machine learning model is trained based on determining a local popularity of a shared item. The local popularity may be computed based on a weighted average of online sales of the shared item delivered near the store. In some examples, the online sales are delivered to delivery zip codes that are within a predetermined radius from a store zip code of the physical store. The weighted average may be computed based on weights, each of which being an inverse of a distance between a respective delivery zip code and the store zip code. During an inference stage, an estimated in-store demand for a previous online-only item can be determined based on a local popularity computed for the online-only item with respect to a physical store.

In various embodiments, the machine learning model can help mapping demands from an ecommerce channel to an in-store channel, using text similarity of item descriptions, local popularity, price and time series, and auto-regressive sales features of the ecommerce item that could potentially be sold in store. For new ecommerce items which have no sales history, sales information of similar items may be leveraged using pre-trained natural language processing models on items that are currently be sold in stores with local popularity context. The estimated is-tore demands for the online items can help refreshing the store assortment of each store.

Furthermore, in the following, various embodiments are described with respect to methods and systems for estimating in-store demand based on online data. In some embodiments, a machine learning model is trained based on data of shared items that are being sold both online and in-store by a retailer. For a physical store of the retailer, inference items are determined from items being sold online but not in-store. An estimated demand is computed for each inference item to be offered for sale in the physical store in a future time period, based on the trained machine learning model and online data of the inference item. Based on the estimated demands for the inference items, recommended assortment data is generated for the physical store in the future time period, and is transmitted to a computing device associated with the physical store for assortment refresh.

Turning to the drawings, FIG. 1 is a network environment 100 configured for estimating in-store demand based on online data, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, a demand estimation computing device 102 (e.g., a server, such as an application server), a web server 104, a cloud-based engine 121 including one or more processing devices 120, workstation(s) 106, a database 116, and one or more customer computing devices 110, 112, 114 operatively coupled over the network 118. The demand estimation computing device 102, the web server 104, the workstation(s) 106, the processing device(s) 120, and the multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the demand estimation computing device 102 and processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of one or more processing devices 120 are offered as a cloud-based service (e.g., cloud computing). For example, the cloud-based engine 121 may offer computing and storage resources of the one or more processing devices 120 to the demand estimation computing device 102.

In some examples, each of the multiple customer computing devices 110, 112, 114 can be a cellular phone, a smart phone, a tablet, a personal assistant device, a voice assistant device, a digital assistant, a laptop, a computer, or any other suitable device. In some examples, the web server 104 hosts one or more retailer websites. In some examples, the demand estimation computing device 102, the processing devices 120, and/or the web server 104 are operated by a retailer, and the multiple customer computing devices 110, 112, 114 are operated by customers of the retailer. In some examples, the processing devices 120 are operated by a third party (e.g., a cloud-computing provider).

The workstation(s) 106 are operably coupled to the communication network 118 via a router (or switch) 108. The workstation(s) 106 and/or the router 108 may be located at a store 109 of a retailer, for example. The workstation(s) 106 can communicate with the demand estimation computing device 102 over the communication network 118. The workstation(s) 106 may send data to, and receive data from, the demand estimation computing device 102. For example, the workstation(s) 106 may transmit data identifying items purchased by a customer at the store 109 to the demand estimation computing device 102.

Although FIG. 1 illustrates three customer computing devices 110, 112, 114, the network environment 100 can include any number of customer computing devices 110, 112, 114. Similarly, the network environment 100 can include any number of the demand estimation computing devices 102, the processing devices 120, the workstations 106, the web servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

Each of the first customer computing device 110, the second customer computing device 112, and the Nth customer computing device 114 may communicate with the web server 104 over the communication network 118. For example, each of the multiple computing devices 110, 112, 114 may be operable to view, access, and interact with a website, such as a retailer's website, hosted by the web server 104. The web server 104 may transmit user session data related to a customer's activity (e.g., interactions) on the website. For example, a customer may operate one of customer computing devices 110, 112, 114 to initiate a web browser that is directed to the website hosted by the web server 104. The customer may, via the web browser, view item advertisements for items displayed on the website, and may click on item advertisements, for example. The website may capture these activities as user session data, and transmit the user session data to the demand estimation computing device 102 over the communication network 118. The website may also allow the operator to add one or more of the items to an online shopping cart, and allow the customer to perform a "checkout" of the shopping cart to purchase the items. In some examples, the web server 104 transmits purchase data identifying items the customer has purchased from the website to the demand estimation computing device 102.

In some examples, the store 109 may transmit an assortment request to the demand estimation computing device 102. The assortment request may be sent standalone or together with store related data of the store 109. In some examples, the assortment request may carry or indicate current product assortment information regarding current products being offered for sale in the store 109.

In some examples, the demand estimation computing device 102 may execute one or more models (e.g., programs or algorithms), such as a machine learning model, deep learning model, statistical model, etc., to compute estimated in-store demands for items, which are currently sold online but not in-store, when these items are offered for sale in the store 109 during a future time period, e.g. next month or next year. The demand estimation computing device 102 may generate and transmit recommended assortment data based on the estimated in-store demands to the store 109 over the communication network 118, and the store 109 may refresh its assortment according to the recommended assortment data.

In some examples, the demand estimation computing device 102 may compute an estimated in-store demand for an item based on a machine learning model that is trained based on shared items sold both online and in-store. In some embodiments, top similar items are determined for the item based on text similarity of their item descriptions relative to the item description of item, such that in-store demands for the top similar items in this year can be used to estimate an in-store demand for the item in next year based on the trained machine learning model. In some embodiments, the in-store demand for the item is computed also based on a local item popularity, which is computed based on a weighted average of online transactions that are delivered to delivery zip codes within a predetermined radius from the store's zip code, with each respective weight being an inverse of a distance between the respective delivery zip code and the store's zip code. In some embodiments, the in-store demand for the item may be computed also based on: store traffic data of an item category including the item in the store; online price data for the item; online historical demand data for the item; shipping speed data for online orders of the item; in-store price data for each of the top similar items; and in-store historical demand data for each of the top similar items.

The demand estimation computing device 102 is further operable to communicate with the database 116 over the communication network 118. For example, the demand estimation computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the demand estimation computing device 102, in some examples, the database 116 can be a local storage device, such as a hard drive, a non-volatile memory, or a USB stick. The demand estimation computing device 102 may store purchase data received from the web server 104 in the database 116. The demand estimation computing device 102 may receive store related data from different stores 109 and store them as store data in the database 116. The demand estimation computing device 102 may also receive from the web server 104 user session data identifying events associated with browsing sessions, and may store the user session data in the database 116.

In some examples, the demand estimation computing device 102 generates and/or updates different models for estimating in-store demand based on online data. The models, when executed by the demand estimation computing device 102, allow the demand estimation computing device 102 to determine in-store demands and generate recommended assortment data for each store to refresh assortment for a future time period.

In some examples, the demand estimation computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, the demand estimation computing device 102 may generate recommended assortment data.

Figure 2:
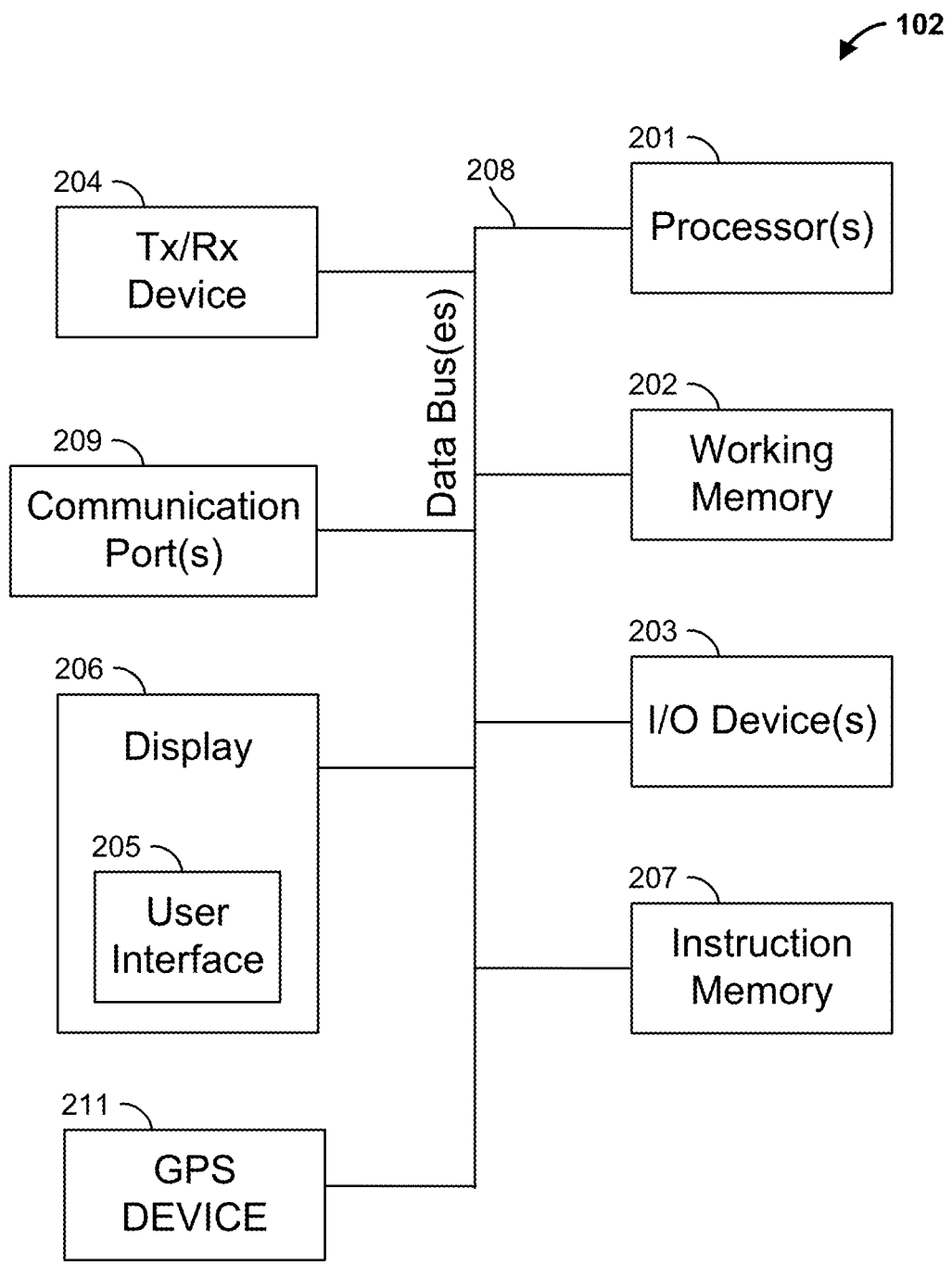
FIG. 2 is a block diagram of a demand estimation computing device, in accordance with some embodiments of the present teaching.

FIG. 2 illustrates a block diagram of a demand estimation computing device, e.g. the demand estimation computing device 102 of FIG. 1, in accordance with some embodiments of the present teaching. In some embodiments, each of the demand estimation computing device 102, the web server 104, the workstation(s) 106, the multiple customer computing devices 110, 112, 114, and the one or more processing devices 120 in FIG. 1 may include the features shown in FIG. 2. Although FIG. 2 is described with respect to the demand estimation computing device 102. It should be appreciated, however, that the elements described can be included, as applicable, in any of the demand estimation computing device 102, the web server 104, the workstation(s) 106, the multiple customer computing devices 110, 112, 114, and the one or more processing devices 120.

As shown in FIG. 2, the demand estimation computing device 102 can include one or more processors 201, a working memory 202, one or more input/output devices 203, an instruction memory 207, a transceiver 204, one or more communication ports 209, a display 206 with a user interface 205, and an optional global positioning system (GPS) device 211, all operatively coupled to one or more data buses 208. The data buses 208 allow for communication among the various devices. The data buses 208 can include wired, or wireless, communication channels.

The processors 201 can include one or more distinct processors, each having one or more cores. Each of the distinct processors can have the same or different structure. The processors 201 can include one or more central processing units (CPUs), one or more graphics processing units (GPUs), application specific integrated circuits (ASICs), digital signal processors (DSPs), and the like.

The instruction memory 207 can store instructions that can be accessed (e.g., read) and executed by the processors 201. For example, the instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. The processors 201 can be configured to perform a certain function or operation by executing code, stored on the instruction memory 207, embodying the function or operation. For example, the processors 201 can be configured to execute code stored in the instruction memory 207 to perform one or more of any function, method, or operation disclosed herein.

Additionally, the processors 201 can store data to, and read data from, the working memory 202. For example, the processors 201 can store a working set of instructions to the working memory 202, such as instructions loaded from the instruction memory 207. The processors 201 can also use the working memory 202 to store dynamic data created during the operation of the demand estimation computing device 102. The working memory 202 can be a random access memory (RAM) such as a static random access memory (SRAM) or dynamic random access memory (DRAM), or any other suitable memory.

The input-output devices 203 can include any suitable device that allows for data input or output. For example, the input-output devices 203 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 207. In some examples, the communication port(s) 209 allow for the transfer (e.g., uploading or downloading) of data, such as machine learning model training data.

The display 206 can be any suitable display, and may display the user interface 205. The user interfaces 205 can enable user interaction with the demand estimation computing device 102. For example, the user interface 205 can be a user interface for an application of a retailer that allows a customer to view and interact with a retailer's website. In some examples, a user can interact with the user interface 205 by engaging the input-output devices 203. In some examples, the display 206 can be a touchscreen, where the user interface 205 is displayed on the touchscreen.

The transceiver 204 allows for communication with a network, such as the communication network 118 of FIG. 1. For example, if the communication network 118 of FIG. 1 is a cellular network, the transceiver 204 is configured to allow communications with the cellular network. In some examples, the transceiver 204 is selected based on the type of the communication network 118 the demand estimation computing device 102 will be operating in. The processor(s) 201 is operable to receive data from, or send data to, a network, such as the communication network 118 of FIG. 1, via the transceiver 204.

The optional GPS device 211 may be communicatively coupled to the GPS and operable to receive position data from the GPS. For example, the GPS device 211 may receive position data identifying a latitude, and longitude, from a satellite of the GPS. Based on the position data, the demand estimation computing device 102 may determine a local geographical area (e.g., town, city, state, etc.) of its position. Based on the geographical area, the demand estimation computing device 102 may determine relevant trend data (e.g., trend data identifying events in the geographical area) and cluster different stores into different regions.

Figure 3:
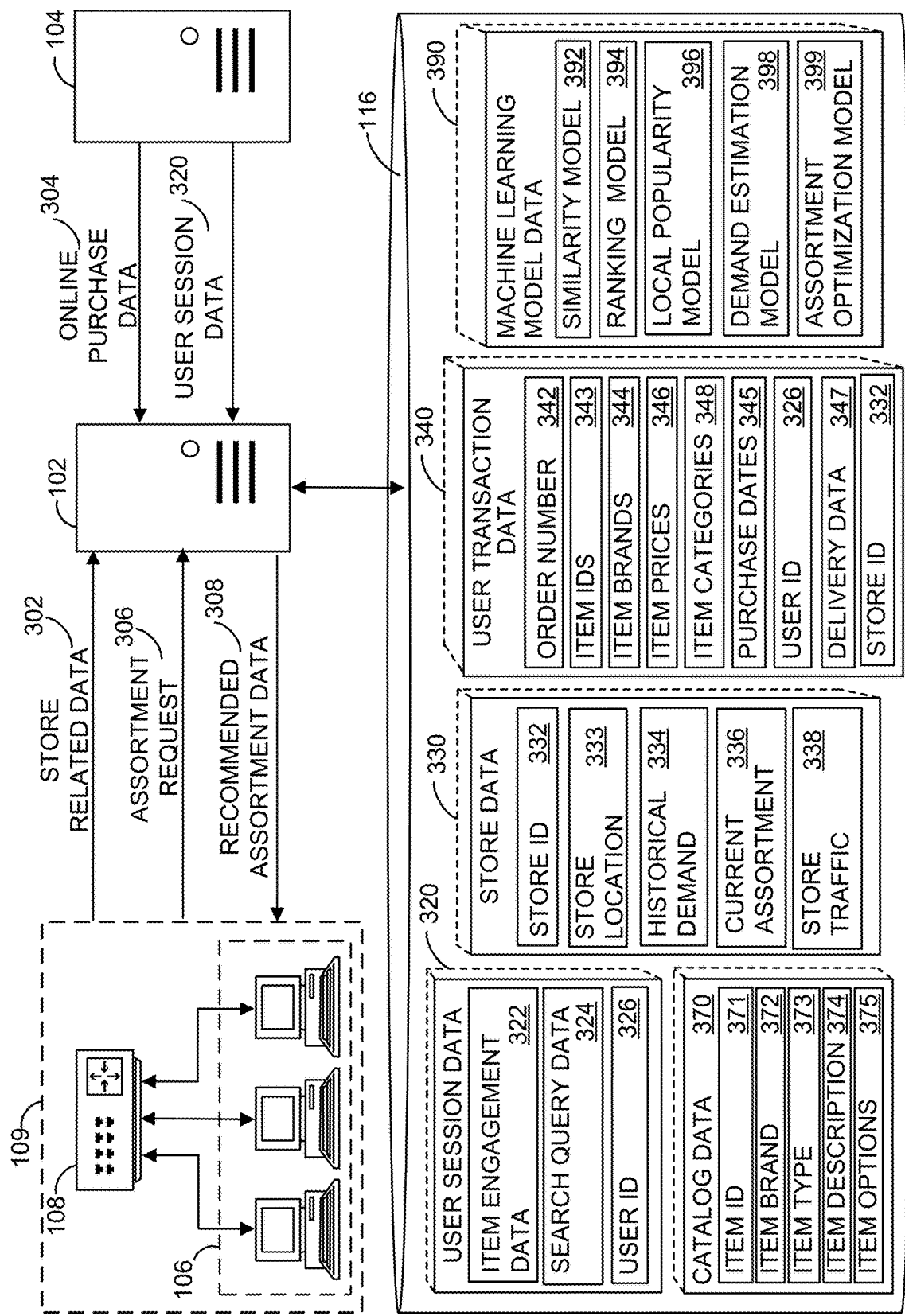
FIG. 3 is a block diagram illustrating various portions of a system for estimating in-store demand based on online data, in accordance with some embodiments of the present teaching.

FIG. 3 is a block diagram illustrating various portions of a system for estimating in-store demand based on online data, e.g. the system shown in the network environment 100 of FIG. 1, in accordance with some embodiments of the present teaching. As indicated in FIG. 3, the demand estimation computing device 102 may receive user session data 320 from the web server 104, and store the user session data 320 in the database 116. The user session data 320 may identify, for each user (e.g., customer), data related to that user's browsing session, such as when browsing a retailer's webpage hosted by the web server 104.

In some examples, the user session data 320 may include item engagement data 322, search query data 324, and user ID 326 (e.g., a customer ID, retailer website login ID, a cookie ID, etc.). The item engagement data 322 may include one or more of a session ID (i.e., a website browsing session identifier), item clicks identifying items which a user clicked (e.g., images of items for purchase, keywords to filter reviews for an item), items added-to-cart identifying items added to the user's online shopping cart, advertisements viewed identifying advertisements the user viewed during the browsing session, and advertisements clicked identifying advertisements the user clicked on. The search query data 324 may identify one or more searches conducted by a user during a browsing session (e.g., a current browsing session).

The demand estimation computing device 102 may also receive online purchase data 304 from the web server 104, which identifies and characterizes one or more online purchases, such as purchases made by the user and other users via a retailer's website hosted by the web server 104. The demand estimation computing device 102 may also receive store related data 302 from the store 109, which identifies and characterizes one or more in-store purchases. In some embodiments, the store related data 302 may also indicate other information about the store 109.

The demand estimation computing device 102 may parse the store related data 302 and the online purchase data 304 to generate store data 330 and user transaction data 340, respectively. In this example, the store data 330 may include, for each store, one or more of: a store ID 332 of the store, a store location 333 of the store, a historical demand 334 indicating historical demands for each displayed item in the store, a current assortment 336 identifying and charactering current assortment of products being displayed in the store, and store traffic 338 indicating traffic data for items in the store. In this example, the user transaction data 340 may include, for each purchase, one or more of: an order number 342 identifying a purchase order, item IDs 343 identifying one or more items purchased in the purchase order, item brands 344 identifying a brand for each item purchased, item prices 346 identifying the price of each item purchased, item categories 348 identifying a product type (e.g., category) of each item purchased, purchase dates 345 identifying the purchase dates of the purchase orders, a user ID 326 for the user making the corresponding purchase, delivery data 347 indicating delivery information for corresponding online orders, and store ID 332 for the corresponding in-store purchase, or for the pickup store or shipping-from store associated with the corresponding online purchase.

In some embodiments, the database 116 may further store catalog data 370, which may identify one or more attributes of a plurality of items, such as a portion of or all items a retailer carries. The catalog data 370 may identify, for each of the plurality of items, an item ID 371 (e.g., an SKU number), item brand 372, item type 373 (e.g., grocery item such as milk, clothing item), item description 374 (e.g., a description of the product including product features, such as ingredients, benefits, use or consumption instructions, or any other suitable description), and item options 375 (e.g., item colors, sizes, flavors, etc.).

The database 116 may also store machine learning model data 390 identifying and characterizing one or more machine learning models and related data. For example, the machine learning model data 390 may include a similarity model 392, a ranking model 394, a local popularity model 396, a demand estimation model 398, and an assortment optimization model 399. The similarity model 392 may be used to generate a similarity score indicating a degree of similarity between two items, e.g. an online-only item and an in-store item, based on a text similarity of their text descriptions and/or their price similarity. For example, the similarity model 392 may be generated based on a pre-trained deep learning model, e.g. a natural language processing model. In some embodiments, the similarity model 392 may also be used to identify top K similar items to an online-only item, and compute a similarity-based demand score for the online-only item based on the similarity scores of the top K similar items. K may be a predetermined positive integer, e.g. 1, 2, 3, or more.

The ranking model 394 may be used to determine a rank for a group of things. In some examples, the ranking model 394 may be used to rank a plurality of in-store items based on their similarity scores with respect to an online item. In some examples, the ranking model 394 may be used to rank a plurality of store clusters based on their respective levels of transaction quantities (of one item, an item category, or a store department). In some examples, the ranking model 394 may be used to rank a plurality of online items based on their respective estimated demands in a future time period. In some examples, the ranking model 394 may be used to rank a plurality of in-store items being sold in a physical store based on sale numbers of the in-store items in a previous time period.

The local popularity model 396 may be used to compute a local item popularity of an online item for a physical store. For example, based on the local popularity model 396, online orders of the online item may be identified during a previous time period, where each online order is delivered to a delivery zip code that is located within a predetermined radius from a store zip code of the physical store. In some embodiments, the local popularity model 396 may be used to compute the local item popularity based on a weighted average of transaction scores associated with the delivery zip codes with their respective associated weights. Each transaction score indicates a quantity of online transactions of the item delivered to a corresponding delivery zip code during the previous time period. Each weight associated with a corresponding delivery zip code may be computed based on an inverse of a distance between the store zip code and the delivery zip code.

The demand estimation model 398 may be used to compute an estimated in-store demand for an online item, when it is offered for sale in a physical store in a future time period, e.g. based on one or more of: a similarity-based demand score for the online item based on similarity scores of the top K similar items; store traffic data of an item category including the online item in the physical store; a local item popularity of the online item for the physical store; online price data for the online item; online historical demand data for the online item; shipping speed data for online orders of the online item; in-store price data for each of the top K similar items; and in-store historical demand data for each of the top K similar items.

Based on the estimated in-store demands for a plurality of online items, the assortment optimization model 399 can be used to generate recommended assortment data for a physical store in the future time period, e.g. next month, next quarter or next year.

In some examples, the demand estimation computing device 102 receives an assortment request 306 from the store 109. The assortment request 306 may be associated with a request for recommended assortment to display products for sale in the store 109 in a future time period. For example, a retailer may be associated with a plurality of physical stores (including the store 109) for selling products in-store, and associated with a website for selling products online. The assortment request 306 is to seek a recommendation on assortment refresh in the store 109, based on trending sales on the website. In response, the demand estimation computing device 102 may obtain in-store data of a first set of items being offered for sale in the plurality of physical stores, from the stores (including the store 109) and/or the database 116. The demand estimation computing device 102 may also obtain online data of a second set of items being offered for sale on the website, from the web server 104 and/or the database 116. The demand estimation computing device 102 may then determine, for the store 109, a plurality of inference items that are in the second set but not in the first set. The demand estimation computing device 102 can compute, for each inference item of the plurality of inference items, an estimated demand for the inference item to be offered for sale in the store 109 in a future time period, based on a machine learning model and the online data of the inference item. The machine learning model may include one or more of the models in the machine learning model data 390. In some embodiments, the demand estimation computing device 102 may generate, based on the estimated demands for the plurality of inference items, recommended assortment data 308 for the store 109 in the future time period.

In some embodiments, the demand estimation computing device 102 may assign one or more of the above described operations to a different processing unit or virtual machine hosted by one or more processing devices 120. Further, the demand estimation computing device 102 may transmit the recommended assortment data 308 to the store 109 in response to the assortment request 306.

Figure 4:
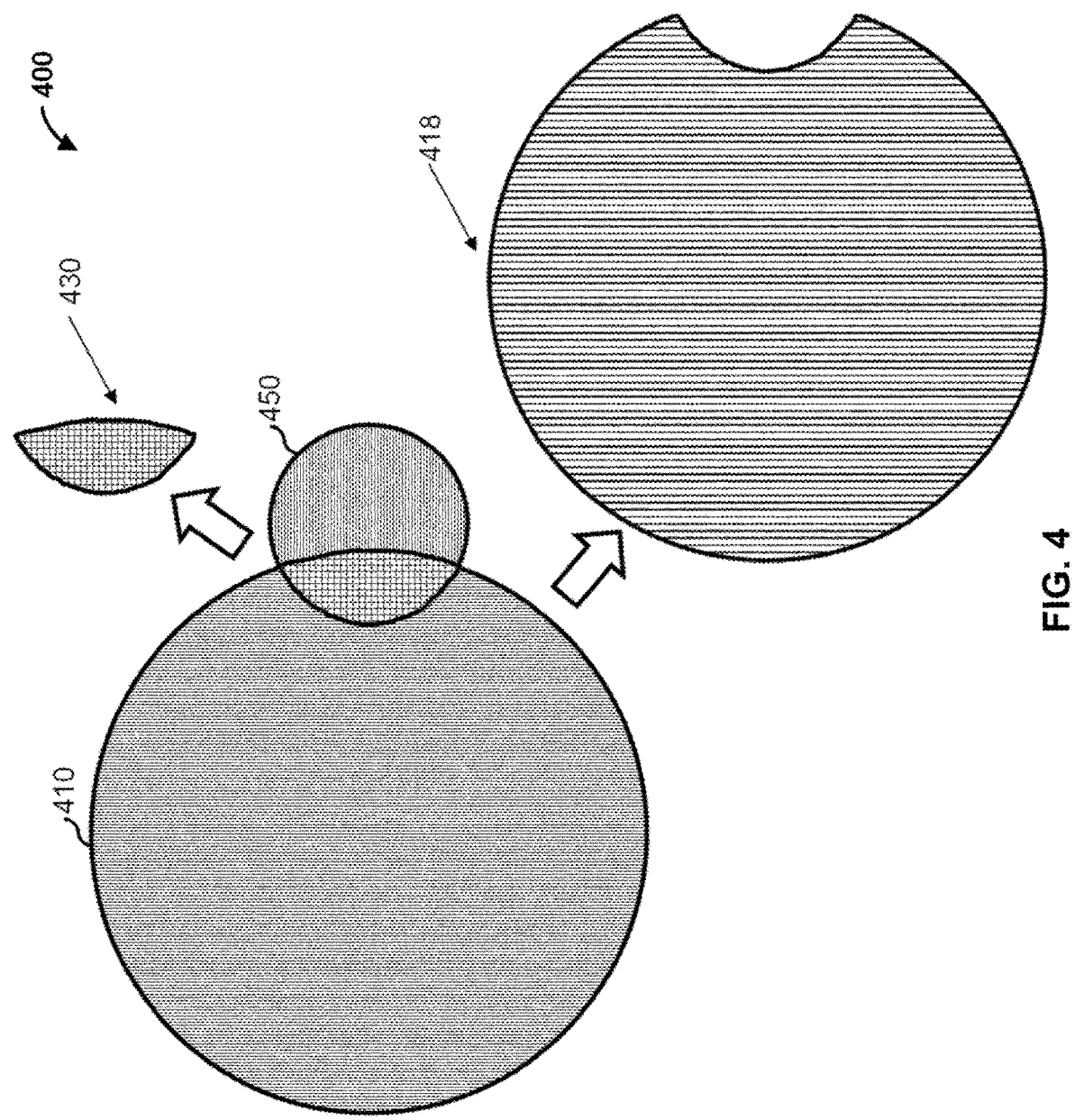
FIG. 4 illustrates exemplary item datasets for model training and inference, in accordance with some embodiments of the present teaching.

FIG. 4 illustrates exemplary item datasets 400 for model training and inference, in accordance with some embodiments of the present teaching. As shown in FIG. 4, a circular area 410 is used to represent a first dataset of all items being sold online, e.g. via a website of a retailer. In addition, a circular area 450 is used to represent a second dataset of all items being sold in-store, e.g. via physical stores of the retailer. As shown in FIG. 4, there is an intersection 430 of the first dataset and the second dataset. As such, the intersection 430 represents all shared items that are being sold both online and in-store.

In some embodiments, a training dataset is generated based on the in-store data and the online data of items in the intersection 430. For example, the training dataset may include in-store transaction data and online transaction data of some shared items being sold both online and in-store. A machine learning model, e.g. including the models in the machine learning model data 390, may be trained based on the training dataset.

In some embodiments, the trained machine learning model may be used to compute estimated demands for inference items. The inference items may be in the first dataset but not in the second dataset. That is, the inference items are online-only items selected from an item dataset represented by an area 418, which is part of the circular area 410 not overlapping with the circular area 450, as shown in FIG. 4. In some examples, because there are many online-only items being sold very sparsely, e.g. with less than 2 items per week, the inference items are generated by excluding these sparsely sold online-only items from the items represented by the area 418. As such, based on the machine learning model trained using shared items, estimated demands for online-only items can be computed for assortment refresh and optimization. In some examples, the size of the dataset represented by the area 418 is much larger than the size of dataset represented by the intersection 430.

In addition to the above dataset differences between training items and inference items, the training items and the inference items may also be different in terms of data timing. For example, while the training items may be determined in May of a year, the inference items may be determined several months later, e.g. in August of that year. That is, when the inference items are determined, there may be new online items and/or shared items that were not available when the training items were determined.

Figure 5:
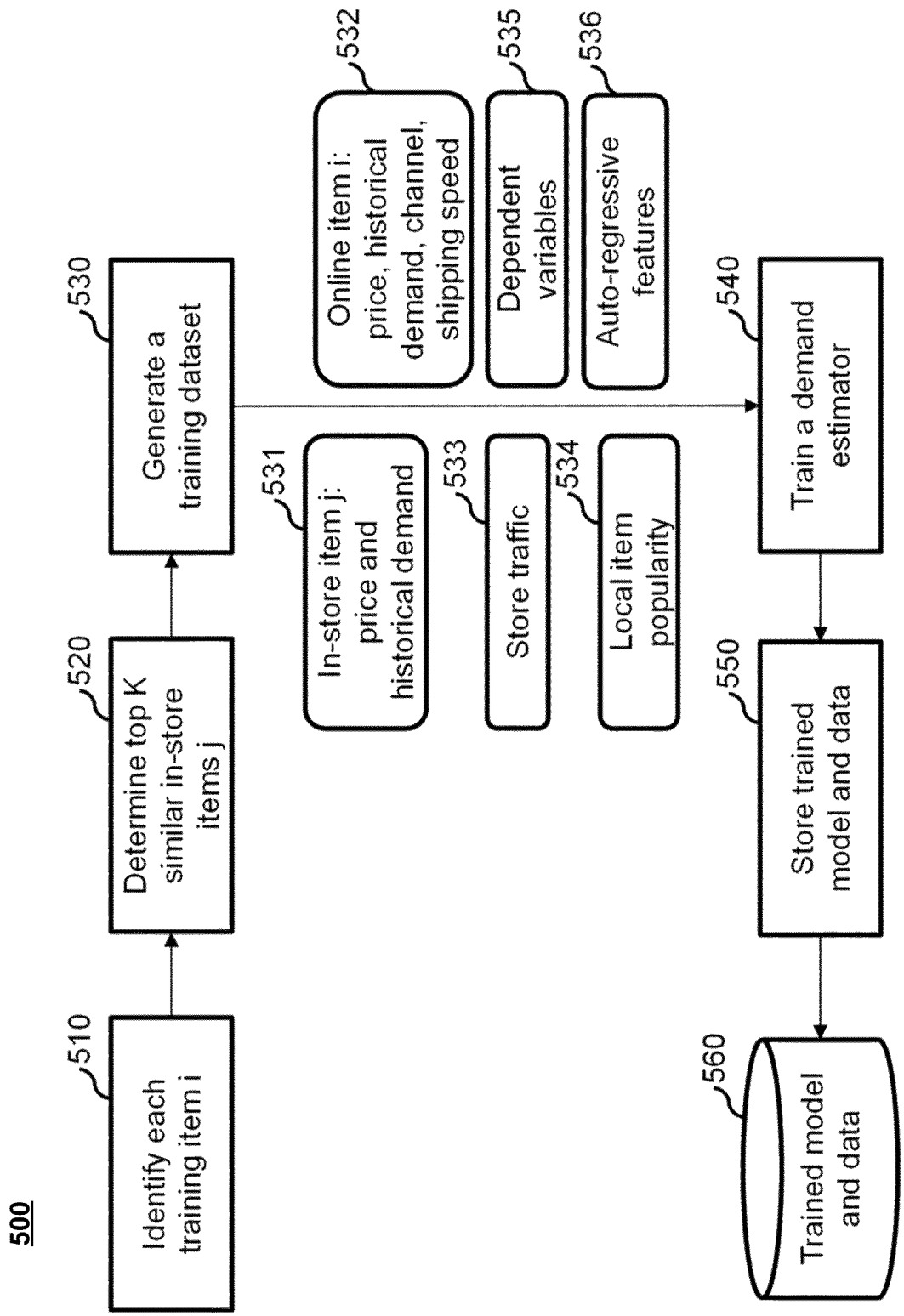
FIG. 5 illustrates a process for training a model for estimating in-store demand based on online data, in accordance with some embodiments of the present teaching.

FIG. 5 illustrates a process 500 for training a model for estimating in-store demand based on online data, in accordance with some embodiments of the present teaching. In some embodiments, the process 500 can be carried out by one or more computing devices, such as the demand estimation computing device 102 and/or the cloud-based engine 121 of FIG. 1. As shown in FIG. 5, the process 500 starts from operation 510, where each training item i, of a plurality of training items, is identified. In some embodiments, each training item i is a shared item that is sold both online and in-store by a retailer.

For each training item i, top K similar in-store items j are determined at operation 520, where K may be a predetermined positive integer. In some embodiments, the top K similar in-store items j may be determined by: computing a similarity score indicating a degree of similarity between the training item i and each of the in-store items sold in physical stores of the retailer; and determining the top K similar in-store items that are ranked highest in terms of similarity scores among the in-store items. In some embodiments, a text description of the training item is compared to a text description of each of the in-store items to compute the similarity score based on a pre-trained deep learning model, e.g. a natural language processing model. The text descriptions of the training item and the in-store items can be obtained from a website and/or the physical stores of the retailer.

In some embodiments, the similarity score may also be computed based on price similarity between the training item i and each of the in-store items. For example, if an in-store item is priced a lot different from the training item i, the similarity score for the in-store item will be smaller, given a text similarity.

In some embodiments, a similarity-based demand score can be computed for the training item based on the similarity scores of the top K similar in-store items. For example, the similarity-based demand score can be computed based on: computing, for each similar item of the top K similar in-store items, a demand score indicating a historical in-store demand of the similar item during a previous time period; computing, for each similar item of the top K similar in-store items, an associated weight based on the similarity score of the similar item; computing a weighted sum of the demand scores of the top K similar in-store items, with their respective associated weights; computing a sum of the associated weights of the top K similar in-store items; and computing the similarity-based demand score for the training item based on a ratio between the weighted sum and the sum.

In some examples, a similarity-based demand score for each similar item is computed as a value of units sold per week (USW) for the similar item during last year. As such, the similarity-based demand score for the training item can be computed based on the following similarity feature $USW_{sim}$ in equation (1):

$$USW_{sim} = \frac{\sum_{j=1}^{5} w_j USW_j}{\sum_{j=1}^{5} w_j} \quad (1)$$

where $USW_j$ represents USW of in-store item j during last year; j=1, 2, . . . 5, and represents the top 5 similar in-store items for a training item i (shared item being sold both online and in-store); and $w_j$ represents a weight (e.g. a similarity score computed based on text similarity and/or price similarity) of the in-store item j.

Based on the similarity-based demand scores of the plurality of training items, a training dataset may be generated at operation 530, for training a machine learning model. In some embodiments, the training dataset may comprise at least one of the following features for each training item i of the plurality of training items: in-store related data 531 (including in-store price data and in-store historical demand data) for each in-store item j of the top K similar in-store items; online related data 532 (including online price data, online historical demand data, shipping speed data, and purchase channels) for online orders of the training item i; store traffic data 533 of an item category including the training item i in each of the plurality of physical stores; a local item popularity 534 of the training item i for each of the plurality of physical stores.

In some embodiments, if an online item's shipping speed is slower and its price is higher, the online item may have more sales in stores. Different online orders may have different purchase channels because they may be associated with products sold by different types of entities, e.g. first party seller as the retailer itself, or third party sellers who are selling on the website of the retailer with their own inventories and/or warehouses.

In some embodiments, the local item popularity 534 of the training item i may be computed for each physical store based on: determining a store zip code where the physical store is located; and determining a plurality of delivery zip codes that are located within a predetermined radius from the store zip code, where each delivery zip code is for delivery of a plurality of online orders of the training item i via the website during a previous time period. Then for each delivery zip code of the plurality of delivery zip codes, a transaction score associated with the delivery zip code may be computed based on a quantity of online transactions of the training item delivered to the delivery zip code during the previous time period, and a weight associated with the delivery zip code may be computed based on an inverse of a distance between the store zip code and the delivery zip code. The local item popularity can then be computed based on a weighted average of the transaction scores associated with the plurality of delivery zip codes with their respective associated weights.

Figure 6:
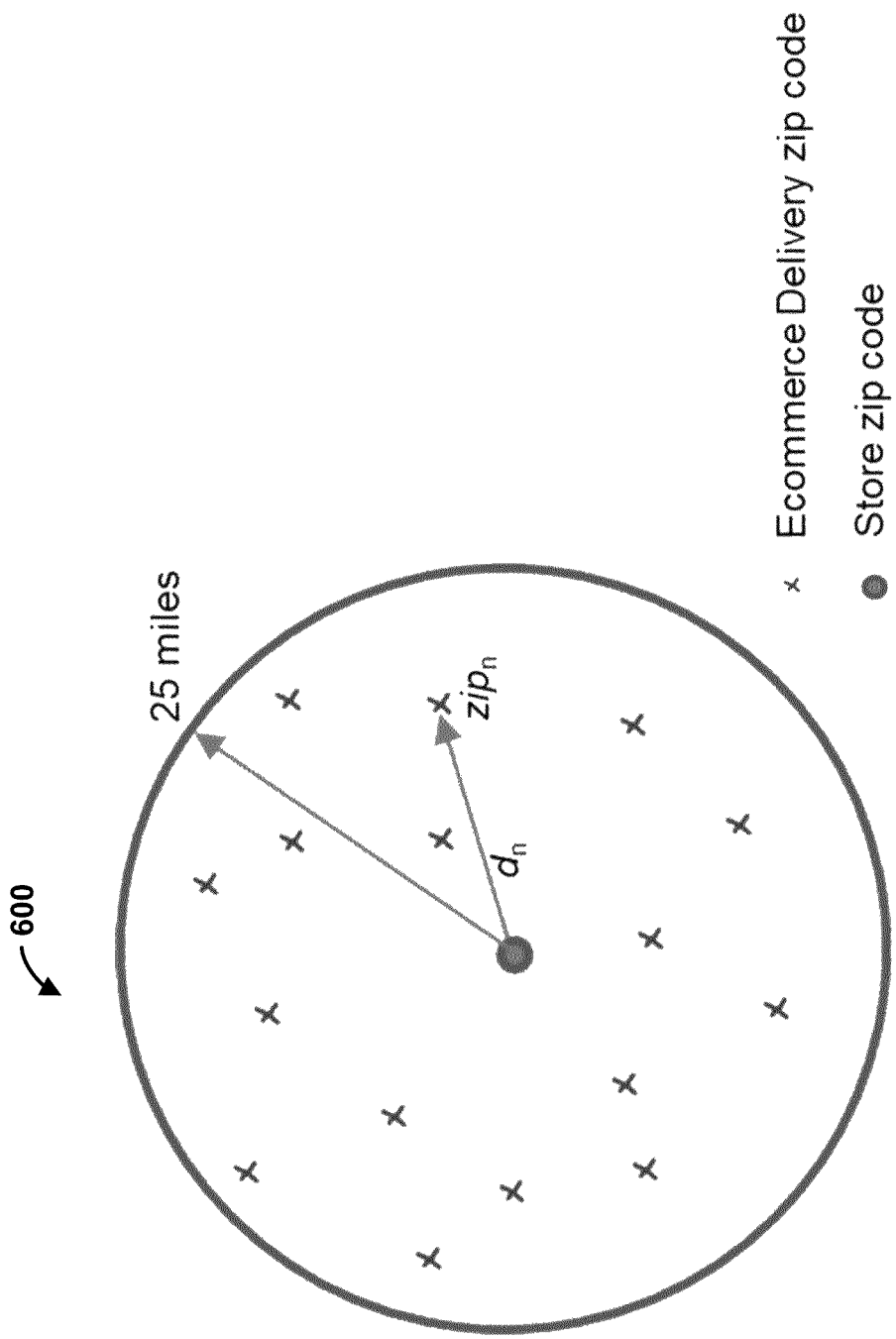
FIG. 6 illustrates an exemplary method for computing a local item popularity, in accordance with some embodiments of the present teaching.

FIG. 6 illustrates an exemplary method 600 for computing a local item popularity, in accordance with some embodiments of the present teaching. An ecommerce or online item popular locally should also be popular in stores locally. As shown in FIG. 6, a plurality of ecommerce delivery zip codes (delivery zip codes for online orders) are located around a store zip code of a physical store, within a predetermined radius threshold from the store zip code. In this example, the predetermined radius threshold is 25 miles. In other examples, the predetermined radius threshold can be 5, 10 or 20 miles, or any other distance, e.g. based on a predetermined forecast accuracy.

As shown in FIG. 6, each ecommerce delivery zip code $zip_n$ has a distance $d_n$ from the store zip code. In some embodiments, online sales or demands of a given item in delivery zip codes within 25 miles radius of a physical store are aggregated to represent a local item popularity for the physical store, as shown below in equation (2).

$$\text{local item popularity} = \frac{1}{\left(\frac{1}{d1} + \frac{1}{d2} + ...\right)} \left(\frac{\text{sales\_zip1}}{d1} + \frac{\text{sales\_zip02}}{d2} + ...\right) \quad (2)$$

As shown in equation (2), the local item popularity in this example is computed as a weighted average of online sales (sales_$zip_n$) in delivery zip codes near the store zip code (e.g. within 25 miles), with each weight being an inverse of the distance ($d_n$) between the store zip code and each respective delivery zip code, where n=1, 2, . . . to represent indexes of the delivery zip codes and their corresponding distances to the store.

Referring back to FIG. 5, the training dataset may also comprise some dependent variables 535. The dependent variables 535 are variables depending on other factors or features, e.g. a sum of in-store USW for each training item over 52 weeks. A correlation matrix may be generated to map other features to the dependent variables. The training dataset may also comprise some auto-regressive features 536. The auto-regressive features 536 may include features whose future values may depend on historical values of the same features, e.g. online sales number for each training item in last 12 months.

In some embodiments, the training dataset may be generated based on: clustering the plurality of physical stores into a plurality of clusters based on a quantity of transactions in each of the plurality of physical stores during a previous time period; determining a rank for each of the plurality of clusters based on their respective levels of transaction quantities; and incorporating the ranks of the plurality of clusters into the training dataset. In some embodiments, the model training and demand estimation can be based on store clusters to increase signal to noise ratio, e.g. by aggregating estimated in-store demands of all stores in one cluster for an online item to determine whether to bring the online item to the stores in the cluster. An item sold in a high traffic store will likely have higher sales than if sold in a low traffic store. The store clusters can serve as store traffic proxy to represent different traffic patterns of different stores, when aggregating estimated in-store demands for an online item.

In some embodiments, the training dataset may be sent to operation 540 to train a demand estimator. In some embodiments, the demand estimator may include one or more of the models in the machine learning model data 390. The trained demand estimator including trained models and data can be stored at operation 550 into a database 560, which may be either part of the database 116 or a standalone database.

In some embodiments, the demand estimator may be trained based on: determining a plurality of machine learning models including at least: a linear regression model, an elastic net model, an extreme gradient boosting (XGBoost) model, and a random forecast (RF) model. For each of the plurality of models, a hyperparameter space is determined to include a plurality of hyperparameters for the machine learning model based on the training dataset. A plurality of evaluations can be performed, where each evaluation searches for a plurality of combinations of hyperparameters in the hyperparameter space. Then at least one optimized combination of hyperparameters is determined based on a Bayesian optimization and a validation using root mean square error (RMSE). From the plurality of models, a best model may be selected based on metrics including mean absolute error (MAE) and bias.

In some embodiments, an item category of interest is determined for moving items from online to in-store. Then shared items (sold both online and in-store) are determined from the item category. A model may be built using a subset of the shared items to estimate the in-store sales given features as discussed above.

In some embodiments, the model is built based on splitting the training dataset into three portions: 60% for training, 20% for validation, and remaining 20% for hold-out testing. Model hyper-parameters are selected with k-fold (e.g. 5-fold) cross-validation using training and validation. Based on metrics and after removing outliers, the model performance are evaluated, e.g. by running 5 evaluations each searching for more than 100 combinations of hyper-parameters in the hyper-parameter space. Best hyper-parameters are determined based on a Hyperopt Bayesian optimization and a validation using RMSE, out of more than 500 hyper-parameter combinations. Additional features from business may be iteratively added into the model. The above steps may be repeated for several different models, e.g., a linear regression model, an elastic net model, an XGBoost model, and an RF model. The best model may be picked using model metrics like MAE and bias, evaluated on the remaining items. In some embodiments, the best model is a tuned RF model, where the RF model is tuned to find the best settings for the knobs and levers in the machine learning model for the training data in question, after the RF model is run in a default mode first. The tuned RF model is the best tuned model for the training data and the tuned model performance is better than the default model.

In some embodiments, an exemplary model formula follows $y_{is} \sim f(x_i, sim_{ij}, x_{js})$, where $y_{is}$ represents a 52-week in-store performance of items j that are similar to an ecommerce item i in store traffic cluster s, $x_i$ represents various features of the ecommerce item i, $x_{js}$ represents various features of the similar item j in store traffic cluster s, and $sim_{ij}$ represents a similarity score between item i and item j, e.g. based on text similarity of their text descriptions and their price similarity. Index i represents the ecommerce item that needs in-store USW estimation. Index j represents the set of top K similar items being sold in-store that are highly similar to the ecommerce item i.

Figure 7:
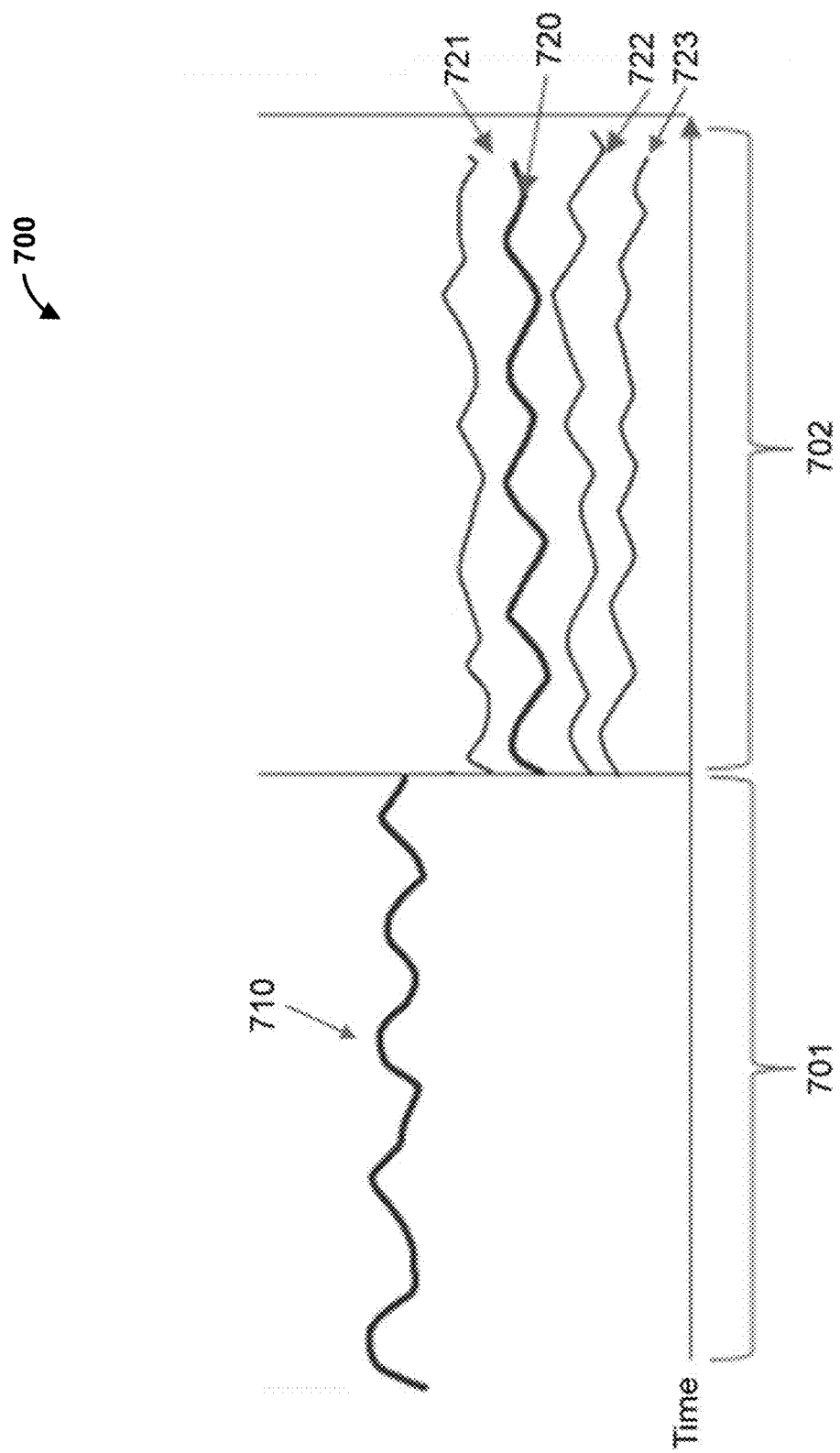
FIG. 7 illustrates exemplary online and in-store item demand data, in accordance with some embodiments of the present teaching.

FIG. 7 illustrates exemplary online and in-store item demand data, in accordance with some embodiments of the present teaching. The data 700 in FIG. 7 include: an online demand data 710 of an item during a first time period 701, and an in-store demand data 720 of the item in all stores during a second time period 702, which is right after the first time period 701. FIG. 7 also shows an in-store demand data 721 of the item in a store cluster 1, an in-store demand data 722 of the item in a store cluster 2, and an in-store demand data 723 of the item in a store cluster 3, all in the second time period 702. In some embodiments, a model is trained (as discussed above) to estimate, based on the online demand data 710 in the first time period 701, at least one of the in-store demand data 720, 721, 722, 723 in the second time period 702.

In some examples during a training stage, the first time period 701 represents a historical period of 52 or 26 weeks before the second time period 702, while the second time period 702 represents the latest 52 weeks before a current time. In some examples during an inference stage for estimating in-store demand based on a trained model, the first time period 701 represents the latest 52 or 26 weeks before a current time, while the second time period 702 represents next 52 weeks from the current time.

Figure 8:
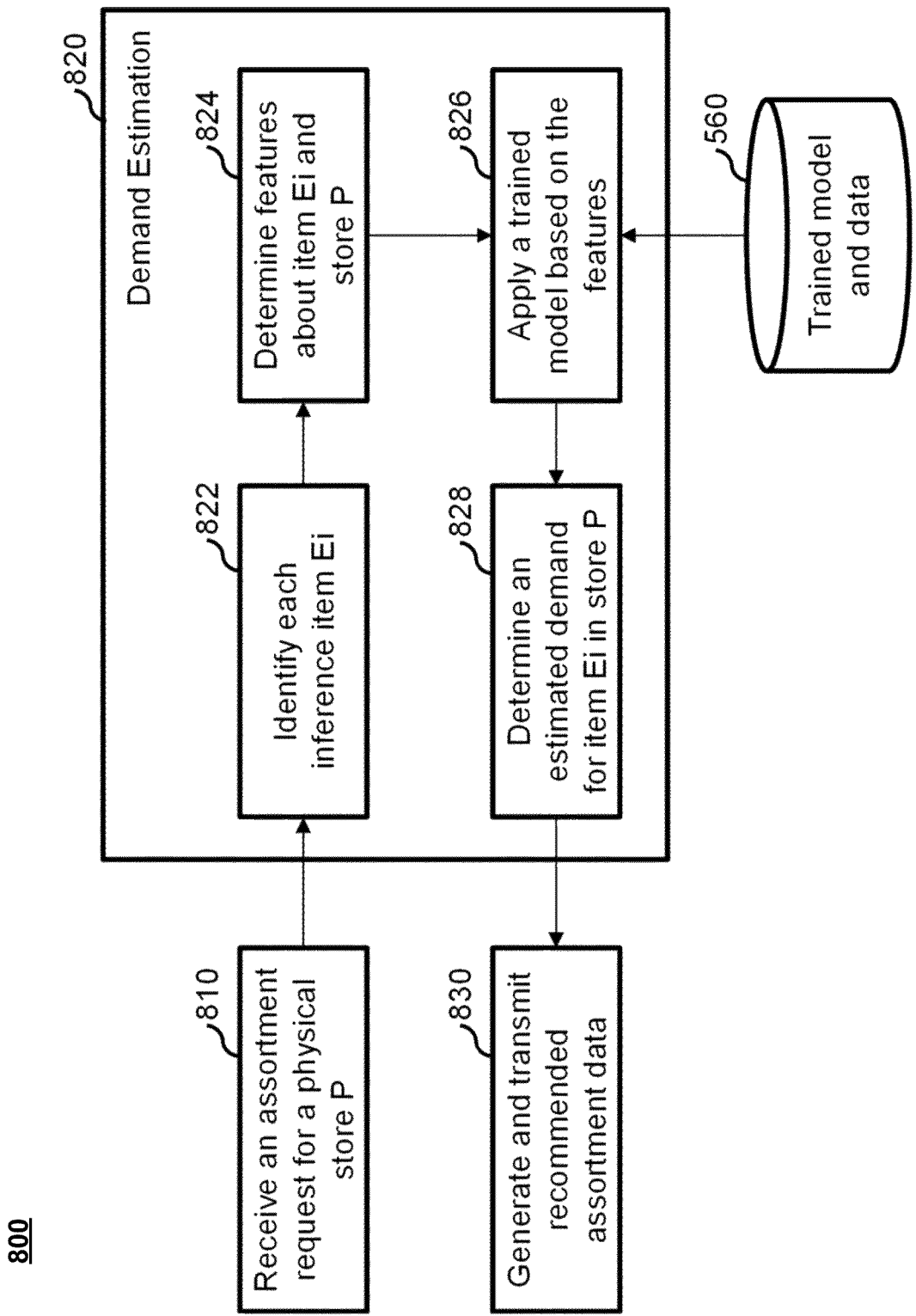
FIG. 8 illustrates a process for estimating in-store demand based on online data using a trained model, in accordance with some embodiments of the present teaching.

FIG. 8 illustrates a process 800 for estimating in-store demand based on online data using a trained model, in accordance with some embodiments of the present teaching. In some embodiments, the process 800 can be carried out by one or more computing devices, such as the demand estimation computing device 102 and/or the cloud-based engine 121 of FIG. 1. As shown in FIG. 8, the process 800 starts from operation 810, where an assortment request is received for a physical store P. In some embodiments, the assortment request may identify the physical store P, e.g. with a store ID.

Based on the assortment request, a demand estimation 820 is performed based on some trained model and data from the database 560, which may include models trained based on the process 500 in FIG. 5. In some embodiments, the demand estimation 820 includes operations 822~828.

As shown in FIG. 8, each inference item Ei of a plurality of inference items is identified at operation 822, based on the assortment request. As previously shown in FIG. 4, the plurality of inference items may be online-only items selected from the item dataset represented by the area 418, while the training items are from the intersection 430 representing all shared items that are being sold both online and in-store.

In some embodiments, the plurality of inference items are determined based on: dividing the shared items in the intersection into ten deciles based on a distribution of online sale numbers of the shared items in the intersection in a previous time period, wherein each of the ten decile has a minimum value and a maximum value of sale numbers; determining all online-only items; assigning each of the online-only items into one of the ten deciles, wherein a sale number of the online-only item is between the minimum value and the maximum value of sale numbers of the decile; removing online-only items in a lowest decile whose maximum value of sale numbers is lowest among the ten deciles; and determining the plurality of inference items as the online-only items in the other nine deciles.

FIG. 9 illustrates an exemplary method 900 to determine inference items for estimating in-store demand, in accordance with some embodiments of the present teaching. As shown in FIG. 9, the shared items are divided into 10 deciles based on yearly online sales of the shared items. Each decile is a category including 157 or 158 shared items whose yearly online sales are between a minimum value and a maximum value of the decile. The 10 deciles are ranked from 1 to 10, according to their maximum (or minimum) yearly online sales of the shared items therein. For example, the decile 1 910 has the lowest maximum yearly online sales, which is 105, i.e. about 2 sales per week. The mean and median of yearly online sales are also listed for each decile.

Then the online-only (or ecommerce-only) items are also divided according to the minimum and maximum values of the ten decides. That is, each online-only item is assigned to a decile X, when the yearly online sales of the online-only item is between the minimum value and the maximum value of the decide X. In the example shown in FIG. 9, more than 96% of the online-only items falls into the decile 1 910 having the lowest maximum and minimum yearly online sales. That is, more than 96% of the online-only items are sold very sparsely, having less than 105 sales per year (or 2 sales per week). Since the system needs to provide forecasts for all possible stores, the number of item-store combinations quickly become challenging for forecasting. To mitigate this issue and make the system more computationally efficient, the items in the bottom most decile 910 (worst performing online only items) can be dropped. As such, the plurality of inference items can be determined as the online-only items in the other nine deciles 2 to 10. In some embodiments, the items may be divided into more or less than 10 groups for filtering inference items.

Referring back to FIG. 8, for each inference item Ei of the determined inference items, features about the item Ei and the store P may be determined at operation 824. In some embodiments, the features may include one or more of the features 531~536 as shown in FIG. 5, but applied to the item Ei and the store P.

At operation 826, a trained model is retrieved from the database 560 and is applied based on the features determined from operation 824. After applying the trained model, an estimated demand for each inference item Ei in the store P is determined at operation 828.

In some embodiments, the estimated demand for the inference item Ei includes information about: a value of estimated units sold per week (USW) for the inference item Ei; a prediction interval including a value range around the value of estimated USW; and a confidence score associated with the prediction interval and the value of estimated USW. For example, the operation 828 may output 10 USW as an average demand for the inference item Ei, and output a prediction interval of 8 to 12 USW with a confidence score of 95%. That is, the estimated demand for the inference item Ei follows a distribution with a mean at 10 USW, with a probability of 95% that the estimated demand falls between 8 and 12 USW.

In some embodiments, the estimated demand and the prediction interval may be computed at an item-store level, i.e. one estimated demand with a prediction interval for each item and each store. The prediction interval at item-store level may be computed based on out-of-fold residual quantiles.

In some embodiments, the estimated demand and the prediction interval may be computed at an item level, i.e. one estimated demand with a prediction interval for each item across all stores of the retailer. The prediction interval at item level may be computed based on: aggregating USW forecast to item level from out-of-fold predictions; computing a percentage error on item aggregated forecast and actuals; and applying a locally-weighted estimated scatterplot smoothing (LOWESS) method. As a linear model is used for each observation locally instead of fitting n-order polynomial to wiggly data, non-monotonic response can be captured. In addition, uncertainties are estimated using bootstrapped sample LOWESS fits. In some examples, bootstrapped LOWESS smoothing is used to estimate 95% prediction intervals.

Based on the estimated demands for the inference items, recommended assortment data is generated and transmitted at operation 830, in response to the assortment request received at the operation 810. In some embodiments, the recommended assortment data is generated based on: determining a first ranking of the plurality of inference items based on their respective estimated demands in the future time period (e.g. next year); obtaining a second ranking of in-store items being sold in store P based on sale numbers of the in-store items in a previous time period (e.g. last year); and generating the recommended assortment data based on the first ranking and the second ranking.

The store P may refresh its assortment in the future time period (e.g. next year), based on the recommended assortment data. In some embodiments, the store P may first determine a bottom 10% of items in its current assortment based on the in-store demands (e.g. USW) of all items in the current assortment, e.g. according to the second ranking. Then the estimated demand for each inference item Ei may be compared to the in-store demands of the bottom 10% items. The inference item Ei will replace the bottom item of the current assortment when the estimated demand of the inference item Ei is larger than the in-store demand of the bottom item, until all bottom 10% items of the current assortment are replaced.

In some embodiments, after determining that the bottom 10% of items, in terms of in-store demands, in the current assortment are B in-store items, the top B inference items (online-only items) can be determined based on the first ranking. Then, the bottom 10% of the current assortment can be swapped with the top B inference items for the updated or refreshed assortment in store P. In above embodiments, the 10% can be replaced with another percentage following a similar manner to refresh assortment.

In some embodiments, all of the inference items from the first ranking and the in-store items from the second ranking are ranked together based on their demand or sales numbers. That is, a combined ranking is generated by merging the first ranking and the second ranking. Then the updated or refreshed assortment in store P can be determined based on top items in the combined ranking.

In some embodiments, all of the inference items from the first ranking and the in-store items from the second ranking are considered to generate the updated or refreshed assortment in store P, based on a knapsack algorithm with a mixed integer programming model. For example, one goal of the assortment refresh is to find which set of items can realize most amount of sales for next year, given the dimensions of the items and shelf space in the store P. As such, forecast outputs of the online to store demand estimation model can be used as an input to the downstream assortment optimization algorithm.

In some embodiments, the models may be trained following the process 500 in FIG. 5 every quarter or every year; and the assortment refresh may be automatically and periodically performed following the process 800 in FIG. 8, every month, every quarter or every year.

In some embodiments, one model is built for each item category. In some embodiments, one single model is built for all item categories of a single department, where the modular category number can be used as a feature for training.

Figure 10:
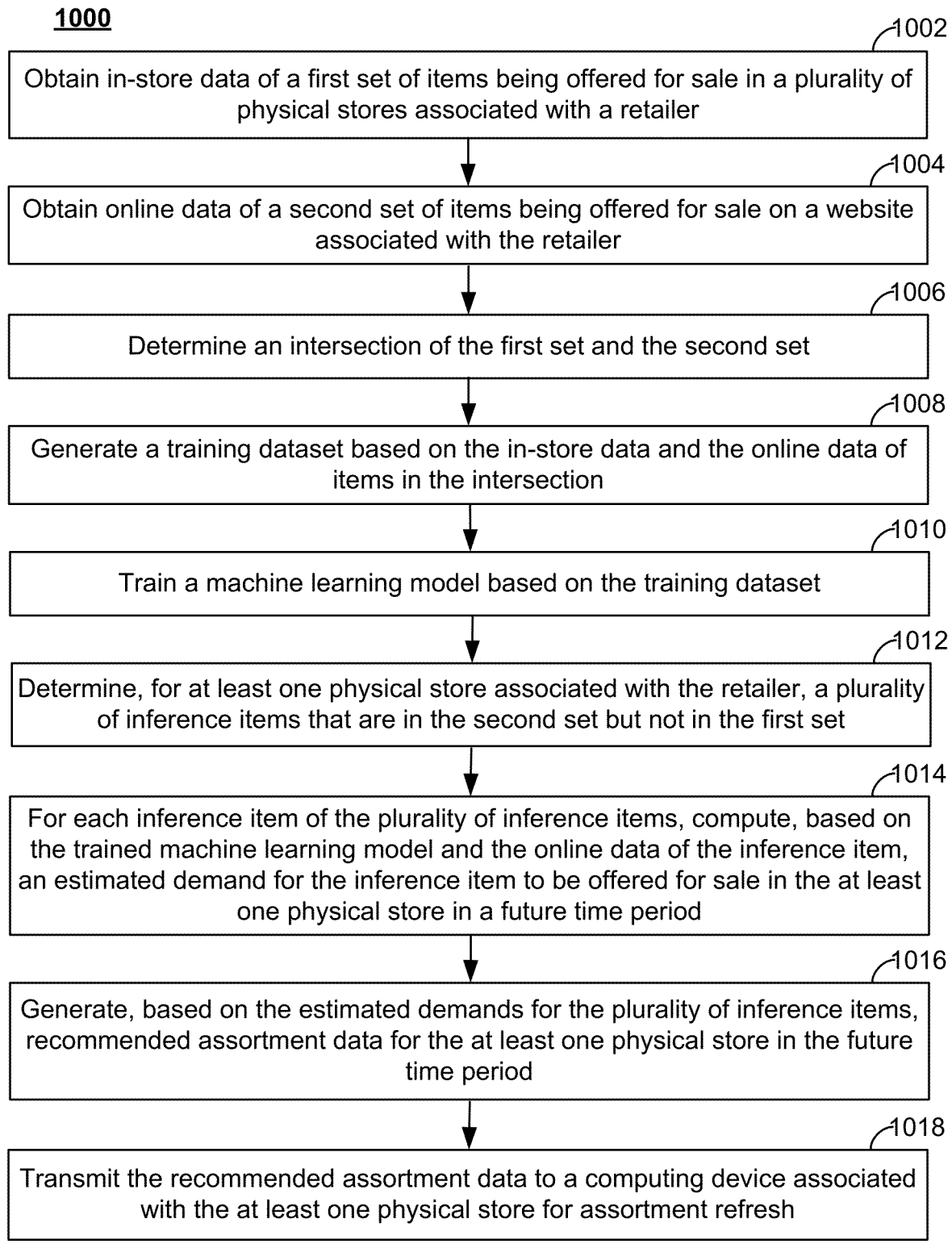
FIG. 10 is a flowchart illustrating an exemplary method for estimating in-store demand based on online data, in accordance with some embodiments of the present teaching.

FIG. 10 is a flowchart illustrating an exemplary method 1000 for estimating in-store demand based on online data, in accordance with some embodiments of the present teaching. In some embodiments, the method 1000 can be carried out by one or more computing devices, such as the demand estimation computing device 102 and/or the cloud-based engine 121 of FIG. 1. Beginning at operation 1002, in-store data of a first set of items are obtained, the first set of items being offered for sale in a plurality of physical stores associated with a retailer. At operation 1004, online data of a second set of items are obtained, the second set of items being offered for sale on a website associated with the retailer. At operation 1006, an intersection of the first set and the second set is determined. A training dataset is computed at operation 1008 based on the in-store data and the online data of items in the intersection. At operation 1010, a machine learning model is trained based on the training dataset.

For at least one physical store associated with the retailer, a plurality of inference items are determined at operation 1012 to be in the second set but not in the first set. For each inference item of the plurality of inference items, an estimated demand is computed at operation 1014 for the inference item to be offered for sale in the at least one physical store in a future time period, based on the trained machine learning model and the online data of the inference item. At operation 1016, recommended assortment data are generated for the at least one physical store in the future time period, based on the estimated demands for the plurality of inference items. The recommended assortment data are transmitted at operation 1018 to a computing device associated with the at least one physical store for assortment refresh.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMS, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
   at least one processor; and
   a non-transitory memory storing instructions that, when executed by the at least one processor, causes the processor to:
   obtain, by the at least one processor, a first dataset of a first set of a plurality of items, wherein each respective item in the first set of the plurality of items is displayed during a first time period at one or more corresponding physical stores in a plurality of physical stores associated with a first organization;
   obtain, by the at least one processor, a second dataset of a second set of a plurality of items, wherein each respective item in the second set of the plurality of items is displayed at one or more corresponding computing devices during the first time period via a website associated with the first organization;
   determine, by the at least one processor, for a respective physical store in the plurality of physical stores, during the first time period, a plurality of inference items exclusive to the second set of the plurality of items;
   for each inference item of the plurality of inference items, generate by providing as input to a machine learning model a subset of the second dataset associated with the inference item and a predetermined geographic boundary associated with the respective physical store in order to receive as output from the machine learning model an estimated demand value for the inference item to be offered for display in the respective physical store during a second time period different from and after the first time period;
   generate, based on the estimated demand value for each inference item in the plurality of inference items, recommended assortment data for the respective physical store in the second time period, wherein the recommended assortment data comprises an identification of a third set of the plurality of items different from the first set of the plurality of items, wherein the first set of the plurality of items and the third set of the plurality of items share a first item and the plurality of inference items and the third set of the plurality of items share a second item different from the first item; and transmit the recommended assortment data to a computing device associated with the respective physical store for shipping of at least the third set of the plurality of items to the respective physical store;

wherein:

the machine learning model is trained based on:

determining an intersection of the first set of the plurality of items and the second set of the plurality of items;

generating a training dataset based on the first dataset and the second dataset of items in the intersection; and training the machine learning model based on the training dataset and by:

selecting an ensemble of models;

determining a hyperparameter space including a plurality of hyperparameters for the machine learning model based on the training dataset;

performing a plurality of evaluations each of which searches for a plurality of combinations of hyperparameters in the hyperparameter space;

determining at least one optimized combination of hyperparameters; and selecting, from the ensemble of models, a model based on the at least one optimized combination of hyperparameters.

2. The system of claim 1, wherein the training dataset is generated based on:

determining a plurality of training items that are in the intersection;

for each training item of the plurality of training items, computing a similarity score indicating a degree of similarity between the training item and each of the first set of the plurality of items;

determining, from the first set of items, a plurality of top K similar items that are ranked highest in terms of similarity scores among the first set of items, wherein K is a predetermined positive integer;

computing a similarity-based demand score for the training item based on the similarity scores of the plurality of top K similar items; and incorporating the similarity-based demand scores of the plurality of training items into the training dataset.

3. The system of claim 2, wherein the similarity score is computed based on comparing a text description of the training item and a text description of each of the first set of the plurality of items to compute the similarity score based on a pre-trained deep learning model.

4. The system of claim 2, wherein the similarity-based demand score is computed based on:

computing, for each similar item of the top K similar items, a demand score indicating a historical in-store demand of the similar item during a previous third time period prior to the first time period;

computing, for each similar item of the top K similar items, an associated weight based on the similarity score of the similar item;

computing a weighted sum of the demand scores of the top K similar items, with their respective associated weights; computing a sum of the associated weights of the top K similar items; and computing the similarity-based demand score for the training item based on a ratio between the weighted sum and the sum.

5. The system of claim 2, wherein, for each training item of the plurality of training items, the training dataset comprises one or more data elements inferred from the intersection, the one or more data elements comprising:

physical capacity data of an item category including the training item in each respective store of the plurality of physical stores;

a geographic attribute value of the training item for each respective store of the plurality of physical stores;

a first numerical value associated with the training item displayed via the website; first historical demand data for the training item displayed via the website;

delivery logistic data for requests for delivery of the training item via the website;

a second numerical value associated with each of the top K similar items displayed in the plurality of physical stores; and in-store historical demand data for each of the top K similar items displayed in the plurality of physical stores.

6. The system of claim 5, wherein a local item popularity is computed based on:

determining a store zip code where each of the plurality of physical stores is located;

determining a plurality of delivery zip codes that are located within a predetermined radius from the store zip code, wherein each delivery zip code is for delivery of a plurality of online transactions of the training item via the website during a previous time period;

for each delivery zip code of the plurality of delivery zip codes, computing a transaction score associated with the delivery zip code based on a quantity of online transactions of the training item delivered to the delivery zip code during the previous time period;

computing a weight associated with the delivery zip code based on an inverse of a distance between the store zip code and the delivery zip code; and computing the local item popularity based on a weighted average of the transaction scores associated with the plurality of delivery zip codes with their respective associated weights.

7. The system of claim 1, wherein the training dataset is generated based on:

clustering the plurality of physical stores into a plurality of clusters based on a quantity of transactions in each of the plurality of physical stores during a previous third time period prior to the first time period;

determining a rank for each of the plurality of clusters based on their respective levels of transaction quantities; and incorporating the ranks of the plurality of clusters into the training dataset.

8. The system of claim 1, wherein the ensemble of models comprises one or more a linear regression model, an elastic net model, an extreme gradient boosting (XGBoost) model, and a random forest (RF) model.

9. The system of claim 1, wherein the plurality of inference items are determined based on:

dividing a subset of items in the intersection into ten deciles based on a distribution of value numbers of the items in the intersection in a previous third time period prior to the first time period, wherein each of the ten deciles has a minimum value and a maximum value of value numbers;

determining all online-only items associated with the second dataset that are in the second set of items but not in the first set of items;

assigning each of the online-only items associated with the second dataset into one of the ten deciles, wherein a value number of the online-only items associated with the second dataset is between the minimum value and the maximum value of the decile;

removing, for assortment recommendation, online-only items associated with the second dataset in a lowest decile whose maximum value of value numbers is lowest among the ten deciles; and determining, for assortment recommendation to the respective physical store, the plurality of inference items as the online-only items associated with the second dataset in the other nine deciles.

10. The system of claim 1, wherein the estimated demand for the inference item includes information about:

a value of estimated units sold per week (USW) for change in quantity of the inference item per unit time period;

a prediction interval including a value range around the value of estimated USW change in quantity of the inference item per unit time period; and a confidence score associated with the prediction interval and the value of estimated USW change in quantity of the inference item per unit time period.

11. The system of claim 1, wherein the recommended assortment data is generated based on:

determining a first ranking of the plurality of inference items based on their respective estimated demands in the second time period;

obtaining a second ranking of one or more items displayed in the respective physical store based on a change in quantity of the one or more items in a previous third time period prior to the first time period; and generating the recommended assortment data based on the first ranking and the second ranking.

12. The system of claim 1, wherein the at least one processor is further configured to read the instructions to provide at least the third set of the plurality of items to a physical address associated with the respective physical store.

13. The system of claim 1, wherein the first time period and the second time period are contiguous.

14. The system of claim 1, wherein the machine learning model is further trained based on:

determining a plurality of training items associated with both the first set of items and the second set of items; and determining, for each respective training item of the plurality of training items, using at least one attribute associated with the respective training item, a corresponding first regional area associated with each respective store in the plurality of physical stores;

a first local item popularity of the respective training item at the corresponding first regional area;

a logistical attribute associated with both the corresponding regional area and the respective training item;

a corresponding second regional area proximate to the corresponding first regional area, wherein the corresponding second regional area is associated with a movement of the respective training item within the corresponding second regional area during a third time period prior to the first time period;

a capacity value associated with the corresponding second regional area based on a quantity of the respective training item during the third time period;

a weight associated with the corresponding second regional area based on a distance between the corresponding first regional area and the corresponding second regional area; and a second local item popularity based on the weight associated with the corresponding second regional area.

15. The system of claim 14, wherein at least one inference item in the plurality of inference items is a new item created by a second organization subsequent to determining the plurality of training items and different from the first organization.

16. The system of claim 1, wherein the plurality of physical stores comprises at least three stores, the first set of items comprises at least five items, the second set of items comprises at least 1,500 items, and the plurality of inference items comprises at least 1,500 inference items.

17. The system of claim 1, wherein the machine learning model is further trained based on:

clustering the plurality of physical stores into a plurality of clusters based on a corresponding variance associated with each respective store of the plurality of physical stores during a previous time period;

determining a signal-to-noise attribute associated with each respective store of at least one cluster in the plurality of clusters; and identifying one or more variance patterns associated with the at least one cluster.

18. A computer-implemented method, comprising:

obtaining, by at least one processor, a first dataset of a first set of a plurality of items, wherein each respective item in the first set of the plurality of items is displayed during a first time period at one or more corresponding physical stores in a plurality of physical stores associated with a first organization;

obtaining, by the at least one processor, a second dataset of a second set of a plurality of items, wherein each respective item in the second set of the plurality of items is displayed at one or more corresponding computing devices during the first time period via a website associated with the first organization;

determining, by the at least one processor, for a respective physical store in the plurality of physical stores associated with the first organization during the first time period, a plurality of inference items that are in the second set of the plurality of items but not in the first set;

for each inference item of the plurality of inference items, computing, by providing as input to a machine learning model a subset of the second dataset associated with the inference item and a predetermined geographic boundary associated with the respective physical store, to receive as output from the machine learning model an estimated demand value for the inference item to be displayed in the respective physical store during a second time period different from and after the first time period;

generating, based on the estimated demand value for each inference item in the plurality of inference items, recommended assortment data for the respective physical store in the second time period, wherein the recommended assortment data comprises an identification of a third set of the plurality of items different from the first set of the plurality of items, wherein the first set of the plurality of items and the third set of the plurality of items share a first item and the plurality of inference items and the third set of the plurality of items share a second item different from the first item; and transmitting the recommended assortment data to a computing device associated with the respective physical store for assortment refresh shipping of at least the third set of the plurality of items to the respective physical store;

wherein:
    the machine learning model is trained based on:
        determining an intersection of the first set of the plurality of items and the second set of the plurality of items;
        generating a training dataset based on the first dataset and the second dataset of items in the intersection; and
        training the machine learning model based on the training dataset and by:
            selecting an ensemble of models;
            determining a hyperparameter space including a plurality of hyperparameters for the machine learning model based on the training dataset;
            performing a plurality of evaluations each of which searches for a plurality of combinations of hyperparameters in the hyperparameter space;
            determining at least one optimized combination of hyperparameters; and
            selecting, from the ensemble of models, a model based on the at least one optimized combination of hyperparameters.

19. The method of claim 18, wherein the ensemble of models comprises one or more of a linear regression model, an elastic net model, an extreme gradient boosting (XGBoost) model, and a random forest (RF) model.

20. A non-transitory computer readable medium having instructions stored thereon, wherein the instructions, when executed by at least one processor, cause at least one device to perform operations comprising:

obtaining, by the at least one processor, a first dataset of a first set of a plurality of items, wherein each respective item in the first set of the plurality of items is displayed during a first time period at one or more corresponding physical stores in a plurality of physical stores associated with a first organization;

obtaining, by the at least one processor, a second dataset of a second set of a plurality of items, wherein each respective item in the second set of the plurality of items is displayed at one or more corresponding computing devices during the first time period via a website associated with the first organization;

determining, by the at least one processor, for a respective physical store in the plurality of physical stores associated with the first organization during the first time period, a plurality of inference items that are in the second set of the plurality of items but not in the first set;

for each inference item of the plurality of inference items, computing, by providing as input to a machine learning model a subset of the second dataset associated with the inference item and a predetermined geographic boundary associated with the respective physical store, to receive as output from the machine learning model an estimated demand value for the inference item to be displayed in the respective physical store during a second time period different from and after the first time period;

generating, based on the estimated demand value for each inference item in the plurality of inference items, recommended assortment data for the respective physical store in the second time period, wherein the recommended assortment data comprises an identification of a third set of the plurality of items different from the first set of the plurality of items, wherein the first set of the plurality of items and the third set of the plurality of items share a first item and the plurality of inference items and the third set of the plurality of items share a second item different from the first item; and transmitting the recommended assortment data to a computing device associated with the respective physical store for assortment refresh shipping of at least the third set of the plurality of items to the respective physical store;

wherein:
    the machine learning model is trained based on:
        determining an intersection of the first set of the plurality of items and the second set of the plurality of items;
        generating a training dataset based on the first dataset and the second dataset of items in the intersection; and
        training the machine learning model based on the training dataset and by:
            selecting an ensemble of models;
            determining a hyperparameter space including a plurality of hyperparameters for the machine learning model based on the training dataset;
            performing a plurality of evaluations each of which searches for a plurality of combinations of hyperparameters in the hyperparameter space;
            determining at least one optimized combination of hyperparameters; and
            selecting, from the ensemble of models, a model based on the at least one optimized combination of hyperparameters.

\* \* \* \* \*